(12) United States Patent
Tanaka et al.

(10) Patent No.: US 10,230,280 B2
(45) Date of Patent: Mar. 12, 2019

(54) ROTATING ELECTRIC MACHINE

(71) Applicant: SUZUKI MOTOR CORPORATION, Shizuoka (JP)

(72) Inventors: Junichiro Tanaka, Shizuoka (JP); Ryo Ito, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 295 days.

(21) Appl. No.: 15/141,408

(22) Filed: Apr. 28, 2016

(65) Prior Publication Data
US 2016/0322870 A1 Nov. 3, 2016

(30) Foreign Application Priority Data

Apr. 30, 2015 (JP) .................................. 2015-093238

(51) Int. Cl.
*H02K 21/12* (2006.01)
*H02K 3/12* (2006.01)
*H02K 3/28* (2006.01)
*H02K 3/52* (2006.01)

(52) U.S. Cl.
CPC ................. *H02K 3/12* (2013.01); *H02K 3/28* (2013.01); *H02K 3/522* (2013.01); *H02K 2203/06* (2013.01)

(58) Field of Classification Search
CPC ............ H02K 3/12; H02K 3/28; H02K 3/522; H02K 2203/06
USPC .................................................... 310/156.01
See application file for complete search history.

(56) References Cited

U.S. PATENT DOCUMENTS

| 2002/0047460 A1* | 4/2002 | Yoneda | B62D 5/043 |
| | | | 310/216.112 |
| 2014/0001898 A1 | 1/2014 | Hattori et al. | |
| 2014/0319942 A1* | 10/2014 | Nakayama | H02K 15/0435 |
| | | | 310/71 |

FOREIGN PATENT DOCUMENTS

| EP | 2 207 254 A2 | 7/2010 |
| JP | 2009-232650 A | 10/2009 |
| JP | 2010-166643 A | 7/2010 |
| JP | 2013-42606 A | 2/2013 |
| JP | 2014-116993 A | 6/2014 |

OTHER PUBLICATIONS

Notice of reasons for refusal dated Oct. 30, 2018 in corresponding Japanese Patent Application No. 2015-093238 (with an English machine translation) (4 pages).

* cited by examiner

*Primary Examiner* — Jianchun Qin
(74) *Attorney, Agent, or Firm* — Rothwell, Figg, Ernst & Manbeck, P.C.

(57) ABSTRACT

A rotating electric machine includes: a stator 11 including a plurality of salient poles 13, and a plurality sets of three windings 31 for three phases wound around the plurality of salient poles 13, and a rotor 21. Lines 31a from one ends of the windings 31 for each of the three phases are connected in parallel, and lines 31b from the other ends of the windings 31 of each of the plurality of sets are connected at a neutral point. The number of turns of the winding 31 around a first area on each of the salient poles 13 is less than the number of turns of the winding 31 around a second area on the salient pole 13. The neutral points are arranged on one side of the windings 31 to follow the periphery of the stator 11.

5 Claims, 12 Drawing Sheets

ROTATING ELECTRIC MACHINE

CROSS REFERENCE TO RELATED APPLICATION

This application claims the benefit of Japanese Application Number 2015-093238, filed Apr. 30, 2015, the disclosures of which are incorporated herein in their entirety by reference.

TECHNICAL FIELD

The present invention relates to a rotating electric machine which enables rotation by passing three phase alternating current through windings.

BACKGROUND ART

Rotating electric machines employing stator mounting of windings are popular. A rotating electric machine of this kind is usable as an electrical motor that enables rotation of a rotor by passing three-phase alternating currents through windings on a stator to create magnetic fields. Moreover, in the case of a rotating electric machine employing rotor mounting of permanent magnets, the rotating electric machine is usable as a generator to store regenerative current that is caused by magnetic fields created at the windings (coils) by turning the rotor into the vehicle battery or the like.

As described above, the rotating electric machine with windings through which three-phase alternating currents pass employs a circuit arrangement in which the windings are connected to form the "Y" (or "star") configuration with one ends connected to three voltage sources of three-phase alternating currents, respectively, and the other ends connected to a neutral point (see JP2009-232650A, called "Patent Literature 1" below).

PRIOR ART

Patent Literature

Patent Literature 1: JP2009-232650A

SUMMARY OF INVENTION

Technical Problem

The known circuit arrangement causes a rotating electric machine to grow in size because a wire connection part of the neutral point is arranged on the windings of the stator together with three-phase lines such that they are piled high at coil ends of the windings.

An object of the present invention is to provide a compact rotating electric machine operable on three-phase alternating currents.

Solution to Problem

According to one aspect, there is provided a rotating electric machine with an axis of rotation, comprising: a stator including a plurality of salient poles, and a plurality sets of three windings for three phases wound around the plurality of salient poles; and a rotor rotatable about the axis of rotation in response to magnetic field created upon passing three-phase current through the plurality sets of three phase windings, wherein lines from one ends of the windings for each of the three phases are connected in parallel, and lines from the other ends of the windings of each of the plurality of sets are connected at a neutral point; wherein the number of turns of the winding around a first area on each of the salient poles is less than the number of turns of the winding around a second area on the salient pole, where the first area is less radially remote from the axis of rotation than the second area is; and wherein the neutral points are arranged on one side of the windings to follow the periphery of the stator.

Advantageous Effects of Invention

As mentioned above, one embodiment of the present invention provides a compact rotating electric machine operable on three-phase alternating currents.

DESCRIPTION OF EMBODIMENTS

Referring to the accompanying drawings, the present invention is described. FIGS. 1-12 illustrate one embodiment of the present invention.

Figure 1:
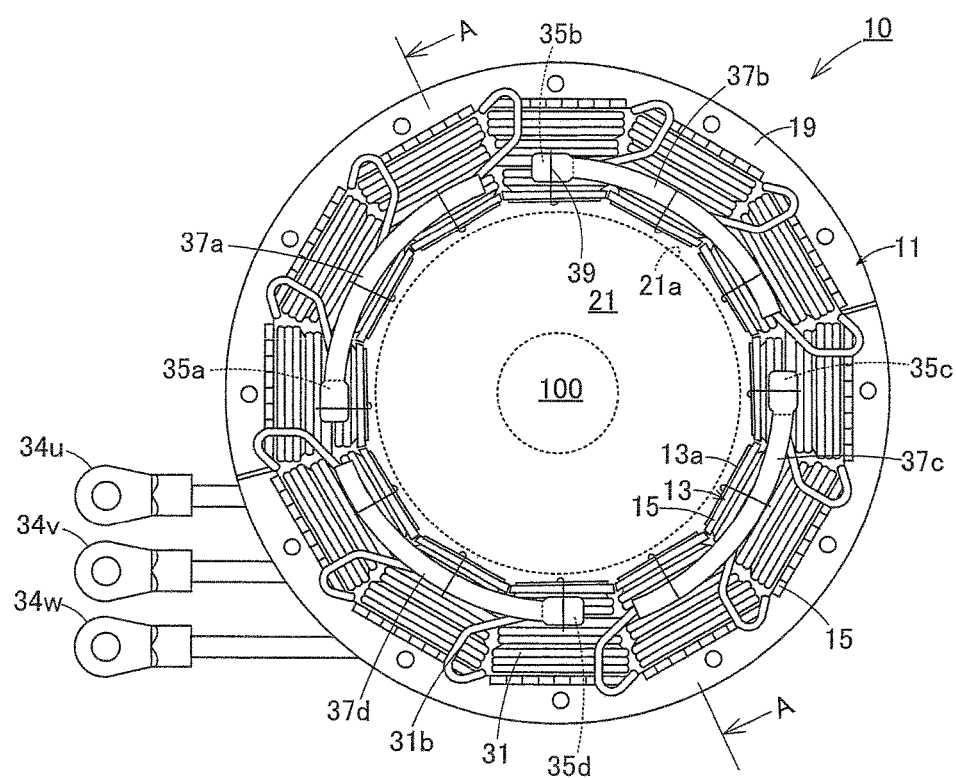
FIG. 1 is a top view of one embodiment of a rotating electric machine.
Figure 2:
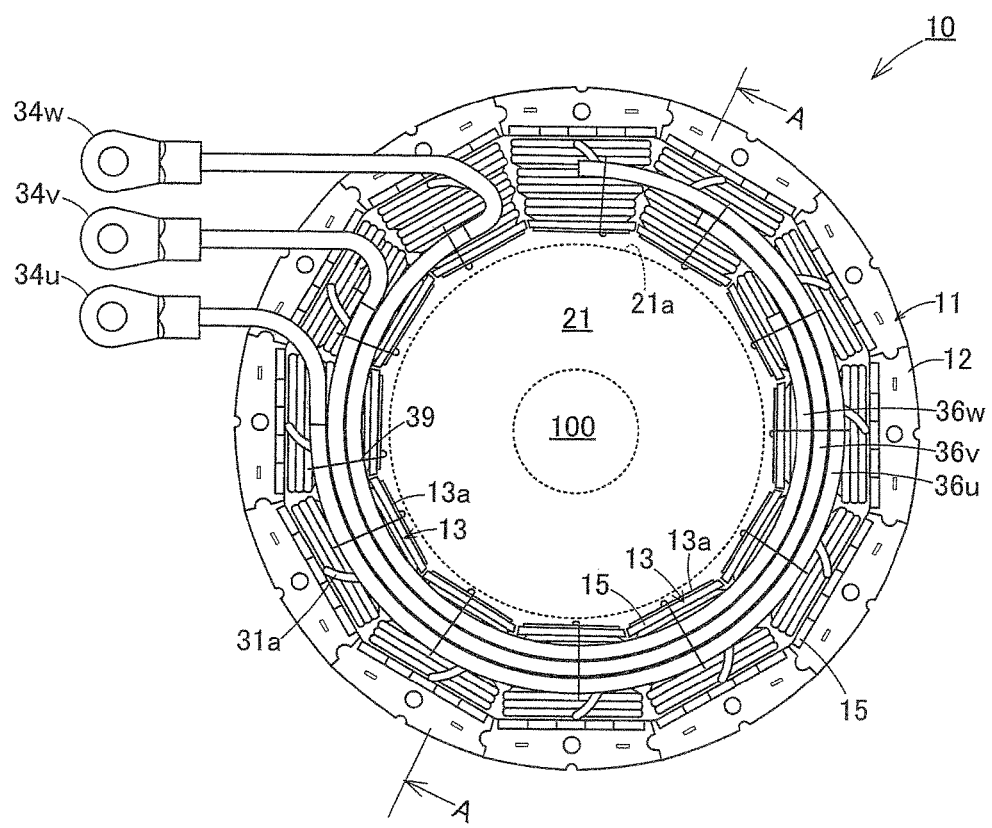
FIG. 2 is a bottom view of the rotating electric machine shown in FIG. 1.
Figure 3:
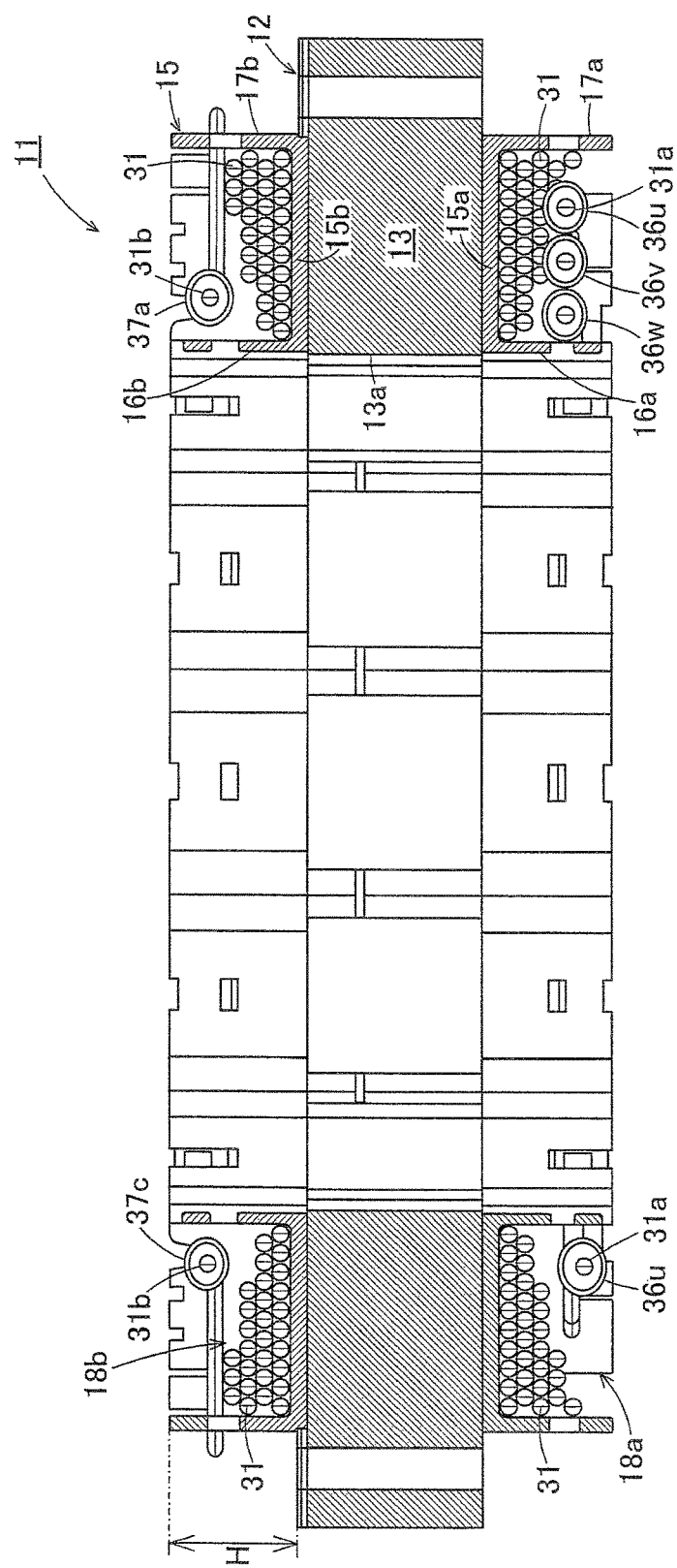
FIG. 3 is a cross section along the line A-A cut through FIG. 1.

Referring particularly to FIGS. 1 to 3, a rotating electric machine 10 includes an approximately ring-shaped stator 11 and a rotor 21 rotatably received in the stator 11. In the illustrated embodiment of the rotating electric machine 10, supplying three-phase alternating currents to the stator 11 causes the rotor 21 to rotate.

The stator 11 is formed in a ring shape by, with split cores 12, which are to be arranged radially about an axis of rotation such that they are placed one after another along a circle around the axis of rotation, being fitted into a housing, not illustrated, fixing the split cores 12 to the housing by screws with a ring member 19 positioned on the circle, i.e., on an outer peripheral side. The split cores 12 include salient poles 13 that have salient structures protruding radially inward or toward the axis of rotation. A conductor is wound into a winding 31 (or a coil) around each of the salient poles 13 of the split cores 12.

Figure 4:
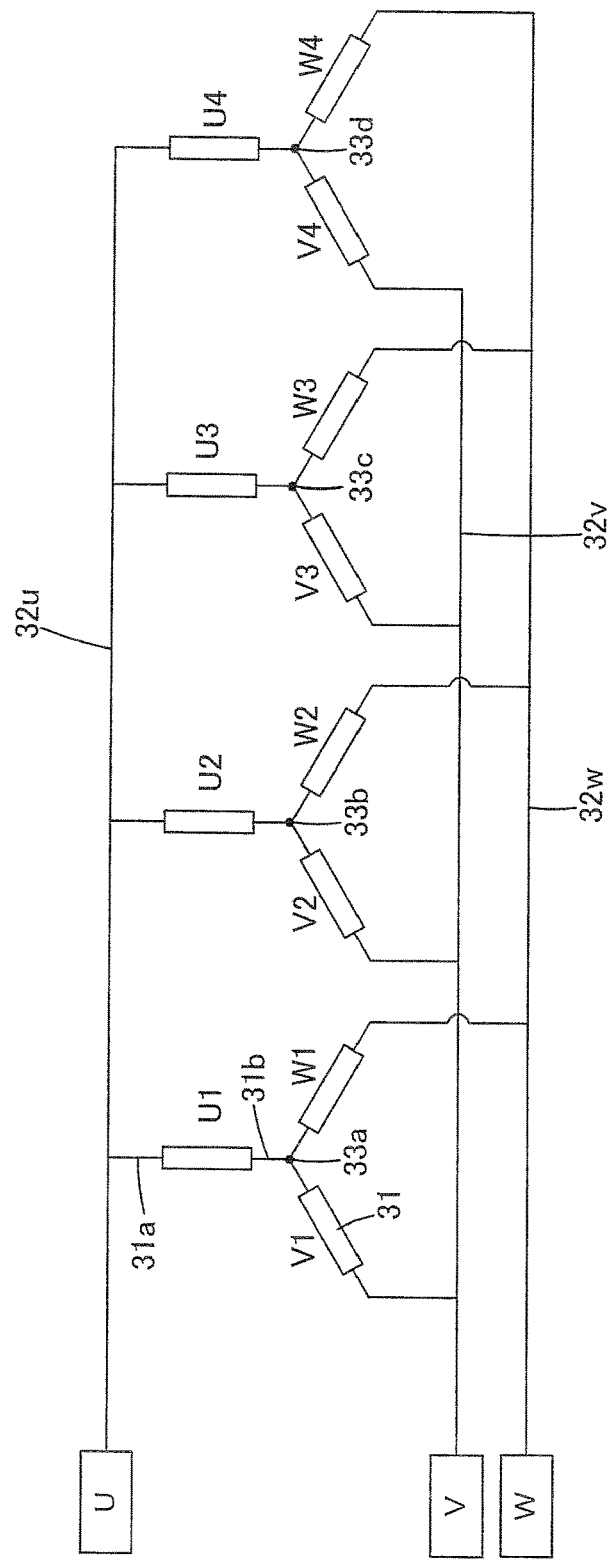
FIG. 4 is a diagram illustrating a circuit configuration of windings installed to a stator.

The stator 11 is configured to create magnetic fields at the salient poles 13 of the split cores 12 by passing three-phase alternating currents through three windings 31 of each set, which are connected to three phase alternating voltage sources, namely, a U phase voltage source, a V phase voltage source and a W phase voltage source as shown in FIG. 4. This causes the stator 11 to produce a "magnet" torque to drive the rotor 21.

The rotor 21 is formed in a disc shape and includes a shaft (or a rotating shaft) 100 fixed thereto such that the rotor 21 and the shaft 100 are concentrically aligned about the axis of rotation. With the shaft 100 rotatably supported by bearings that are mounted to the housing side such that they are positioned at the center surrounded by the split cores 12 of the stator 11, the rotor 21 is rotatable relative to the stator 11 while keeping an outer peripheral surface 21a of the disc shape close to and face to face to inner peripheral end surfaces 13a of the salient poles 13 of the split cores 12.

As a source of magnetic field, for example, the rotor 21 has embedded thereto permanent magnets, not illustrated, on the outer peripheral surface 21a side. The illustrated embodiment of the rotating electric machine 10 is described by exemplifying, but not limited to, a synchronous motor with the permanent magnets located in the rotor 21. For example, rotor mounting of electromagnets as a source of magnetic field may be adopted as a rotor. Moreover, the rotating electric machine may not be limited to the synchronous motor, but may be formed in an induction motor.

Thus, the illustrated embodiment of the rotating electric machine 10 may be used as an electrical motor because, within magnetic field created by the salient poles when three-phase alternating current passes through the windings 31 of the stator 11, a torque to drive the shaft 100 is obtained by attractive force and repulsive force to the permanent magnets. Moreover, the illustrated embodiment of the rotating electric machine 10 may be used as an electrical generator by turning the shaft 100 because, in the case of rotation of the shaft 100 upon receiving a torque, the rotor 21 changes the magnetic flux applied to the coil like windings 31 to induce an induced current which passes through the windings 31.

As can be seen from FIG. 4, the stator 11 includes four sets of three-phase windings 31 circuited in parallel, such that the stator 11 includes twelve armature coils U1, V1, W1, U2, V2, W2, U3, V3, W3, U4, V4 and W4. Three lines 31a leading away from one ends of the three windings 31 of each set are connected to the corresponding imaginary common phase lines 32u, 32v and 32w that are connected to the three U, V and W phase alternating voltage sources, respectively. Three lines 31b leading away from the other ends of the three windings 31 of the set are connected to the corresponding one of imaginary neutral lines (or neutral points) 33a, 33b, 33c and 33d.

Referring to FIG. 2, if implementing the windings 31 to the stator 11, a circuit configuration, in which the windings 31 are connected in parallel to the imaginary common phase lines 32u, 32v and 32w, is formed by caulking ring terminals 34u, 34v and 34w for the three U, V and W phase alternating voltage sources to the lines 31a to establish continuity connections. The lines 31a for the three U, V and W phase alternating voltage sources are received in, for example, protection tubes 36u, 36v and 36w made of silicon with the ring terminals 34u, 34v and 34w exposed.

Referring to FIG. 1, a circuit configuration in which the lines 31b of each of four sets, each including U, V and W phase windings, are connected in common to the corresponding one of the imaginary neutral lines (neutral points) 33a, 33b, 33c and 33d is formed by caulking sleeve terminals 35a, 35b, 35c and 35d for the four sets to the lines 31b to establish continuity connections. The lines 31a for the four sets, each including U, V and W phase windings, are received in, for example, protection tubes 37a, 37b, 37c and 37d made of silicon together with the sleeve terminals 35a, 35b, 35c and 35d.

Referring to FIG. 3, each of the windings 31 is wound like a coil with its insulation ensured with an insulator (or an insulating material) 15 between the winding 31 and the salient pole 13 of the corresponding split core 12. The insulator 15 includes one and the opposite bottom portions 15a and 15b lying on to cover one and the opposite axial ends of the stator 11 axially spaced along the axis of rotation of the shaft 100, respectively. The insulator 15 further includes inner wall portions 16a and 16b that continuously extend along the axis of rotation like ribs from radially inner ends of the bottom portions 15a and 15b and outer wall portions 17a and 17b that continuously extend along the axis of rotation like ribs from radially outer ends of the bottom wall portions 15a and 15b. The inner wall portions 16a and 16b and the outer wall portions 17a and 17b serve as a barrier to restrict the movements of the winding 31.

Figure 5:
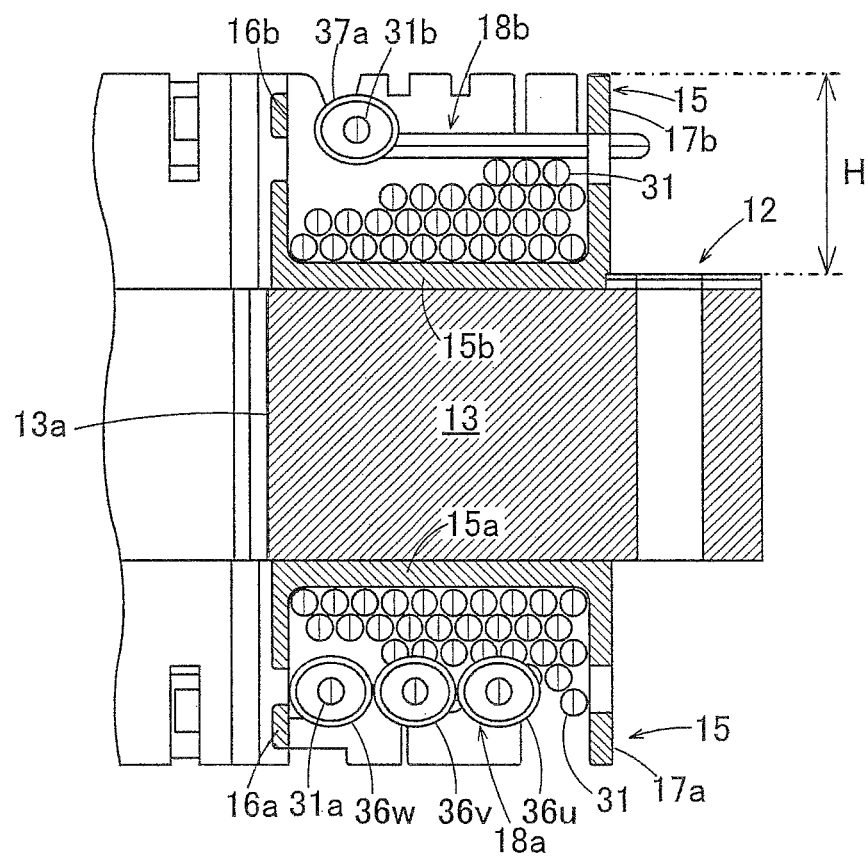
FIG. 5 is a fragmentary enlarged view of FIG. 3.

As best seen in FIG. 5, the winding 31 includes the wire wound around the insulator 15 (actually around the bottom wall portions 15a and 15b) such that the number of turns of the wire wound around a first area that is on the side of the inner wall portions 16a and 16b is less than the number of turns of the wire wound around a second area that is on the side of the outer wall portions 17a and 17b, where the first area is less radially remote from the axis of rotation of the shaft 100 than the second area is. This wiring configuration of the winding 31 provides enough spaces 18a and 18b for the installation of the protection tubes 36u, 36v, 36w, 37a, 37b, 37c and 37d. In other words, the winding 31 is wound around the salient pole 13 on the stator 12 in a way to secure the installation spaces 18a and 18b within the first area near the axis of rotation of the shaft 100.

Referring also to FIGS. 2 and 3, the lines 31a for the three U, V and W phase alternating voltage sources are pulled out of the three windings 31 of each set in a first direction away from the adjacent bottom wall portions 15a approximately along the axis of rotation of the shaft 100 and circuited on the stator 11. These lines 31a are laid in the corresponding installation spaces 18a over the windings 31, each in a state of being received in the corresponding one of the three protection tubes 36u, 36v and 36w which are formed in shapes curving to follow the external ring form of the stator 11 such that they extend along an inner loop of the stator 11. Moreover, the protection tubes 36u, 36v and 36w are laid in the corresponding installation spaces 18a over the windings 31 and extend through the installation spaces 18a.

Turning to FIG. 1 with continuing reference to FIG. 3, the lines 31b are pulled out of the three U, V and W phase windings 31 of each of the four sets in a second direction, which is opposite to the first direction, away from the adjacent bottom wall portions 15b approximately along the axis of rotation of the shaft 100 and circuited on the stator 11. These lines 31b are laid in the corresponding installation spaces 18b over the windings 31, each in a state of being received in the corresponding one of the four protection tubes 37a, 37b, 37c and 37d. Moreover, the protection tubes 37a, 37b, 37c and 37d are laid in the corresponding installation spaces 18b over the windings 31 and extend through the installation spaces 18b.

With the above mentioned wiring configuration, the lines 31a, which are provided for the three U, V and W phase alternating voltage sources, and the lines 31b, which are pulled out of the three U, V and W phase windings 31 of each of the four sets, are distributed in both the first and second directions along the axis of direction of the shaft 100. These lines 31a and 31b are received in the protection tubes 36u, 36v, 36w, 37a, 37b, 37c and 37d that are laid in the installation spaces 18a and 18b created by the above-mentioned deviation of each of the windings 31 wound around the salient poles 13 of the corresponding split cores 12. This makes the rotating electric machine 10 thin by restraining the height H of the coil end of the stator 11 from being increased due to the installation of the lines 31a and 31b.

Moreover, within the stator 11, the windings 31 wound around the salient poles 13 of the split cores 12 are received in the protection tubes 36u, 36v, 36w, 37a, 37b, 37c and 37d, and the protection tubes 36u, 36v, 36w, 37a, 37b, 37c and 37d are installed in the insulators 15 and bounded by binding strings 39 (see FIG. 2 also). This restricts the movement of the windings 31 that may be caused by vibrations during operation of the rotating electric machine 10. Moreover, the windings 31 become immobilized with high reliability by filling the insulators 15 with epoxy resin and they are prevented from being damaged by the penetration of moisture or the like.

Referring to FIGS. 6 to 12, less preferred embodiments are described. In the case of employing a circuit configuration shown in FIG. 6, FIGS. 7 to 9 illustrate one possible installation of four sets of windings 31 to a stator 211. Similarly to the circuit configuration shown in FIG. 4, the windings 31 are made in parallel to imaginary common phase lines 32u, 32v and 32w by caulking ring terminals 34u, 34v and 34w for the three U, V and W phase alternating voltage sources to three lines 31a, which lead away from one ends of the three windings 31 of each of the four sets, to establish continuity connections.

Figure 6:
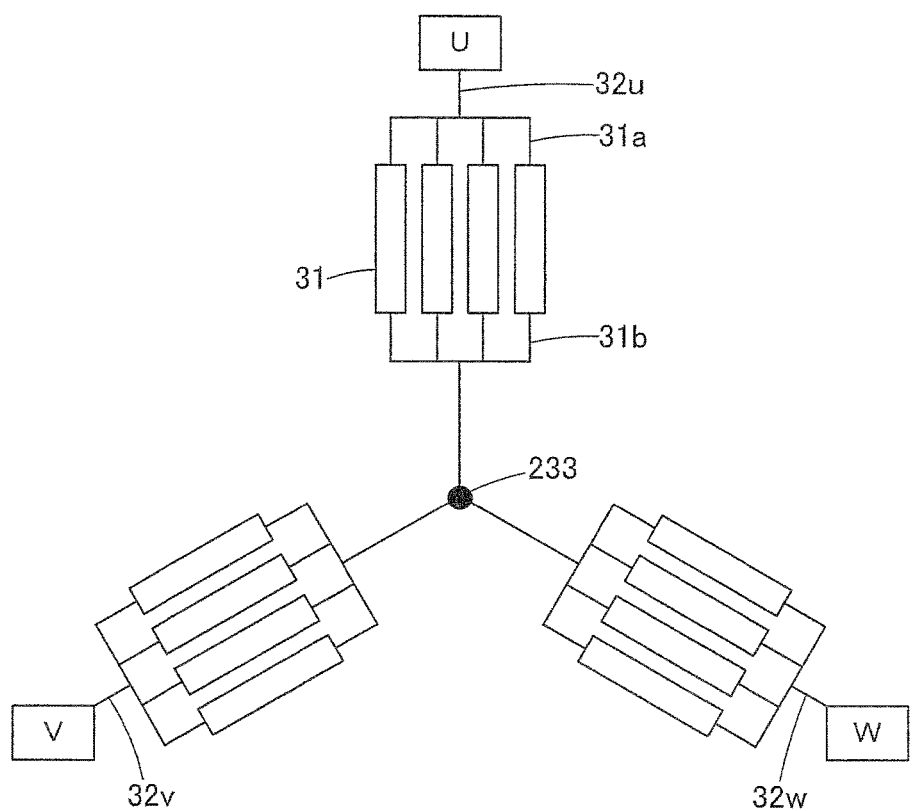
FIG. 6 is a diagram similar to FIG. 4, illustrating another circuit configuration implemented in less preferred embodiments.

As different from the foregoing description, the circuit configuration shown in FIG. 6 is installed to the stator 211 by caulking one sleeve 235 (see FIG. 7) to three lines 31b leading away from the other ends of the three windings 31 of each set such that the lines 31b are connected to a common imaginary neutral line (or neutral point) 233 for all four sets of windings 31.

Figure 7:
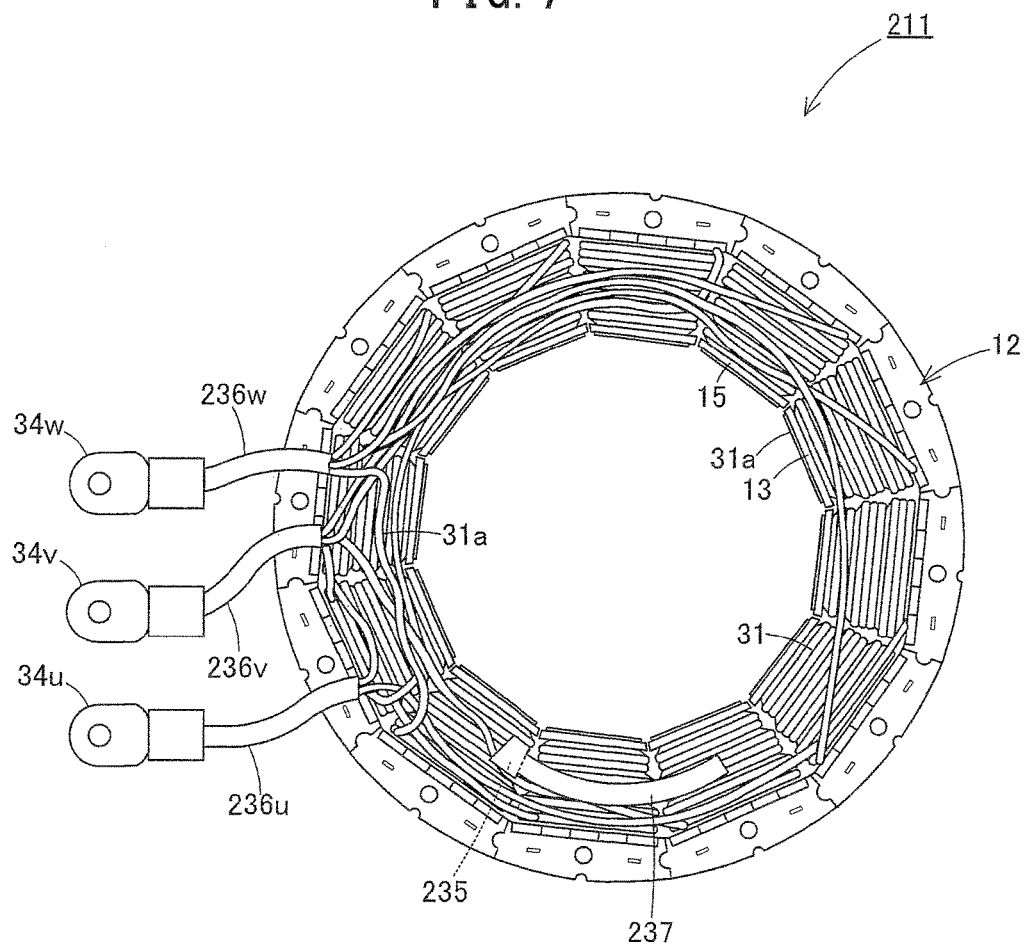
FIG. 7 is a top view similar to FIG. 1, illustrating one less preferred embodiment of a rotating electric machine.
Figure 8:
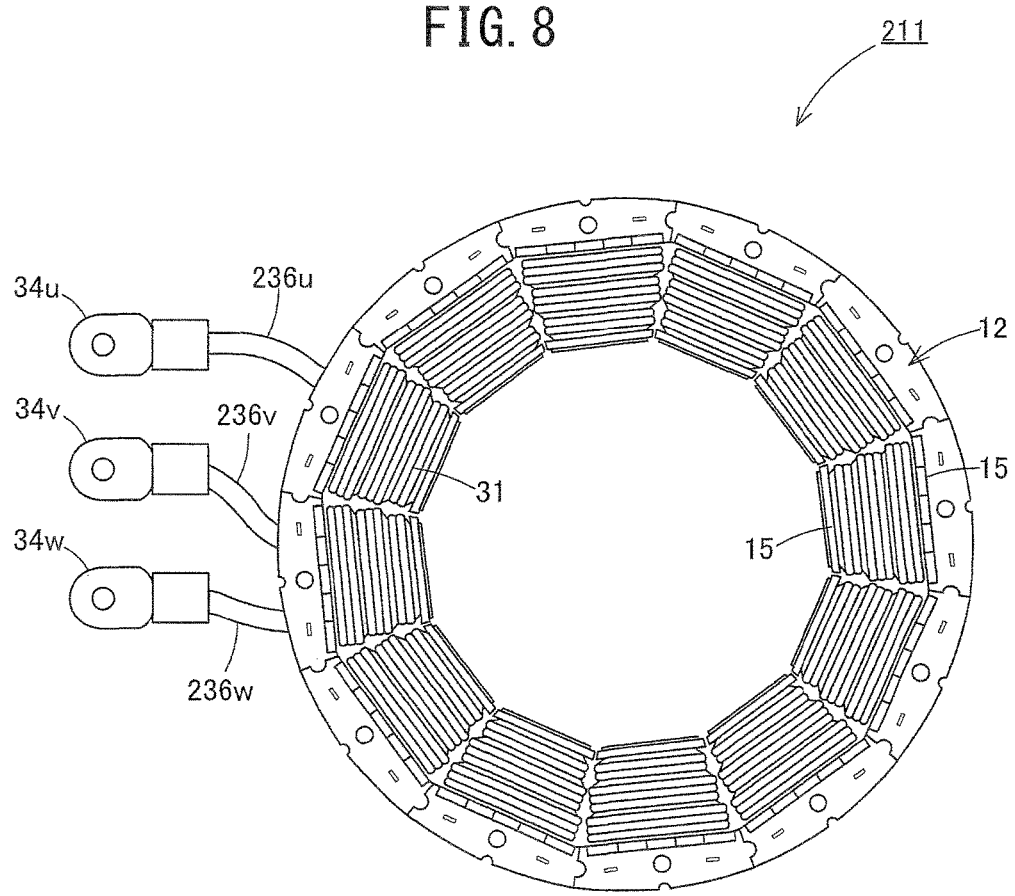
FIG. 8 is a bottom view similar to FIG. 2, illustrating the rotating electric machine shown in FIG. 7.

Moreover, the lines 31a from the one ends of the windings 31, on the stator 211, for each of U, V and W phases are individually wired on one side of the windings 31 as shown in FIG. 7. According to this wiring on the stator 211, protection tubes 236u, 236v and 236w receives only those portions of the lines 31a which extend outward the outer periphery of split cores 12 and the ring terminals 34u, 34v and 34w are caulked to the lines 31a within the protection tubes 236u, 236v and 236w to establish continuity connections.

With continuing reference to FIG. 7, the lines 31b from the other ends of the windings 31 on the stator 211 are wired on the same one side of the windings 31 as the lines 31a and received in the one protection tube 237 that is formed in a shape curving to follow the external ring form of the stator 211.

Figure 9:
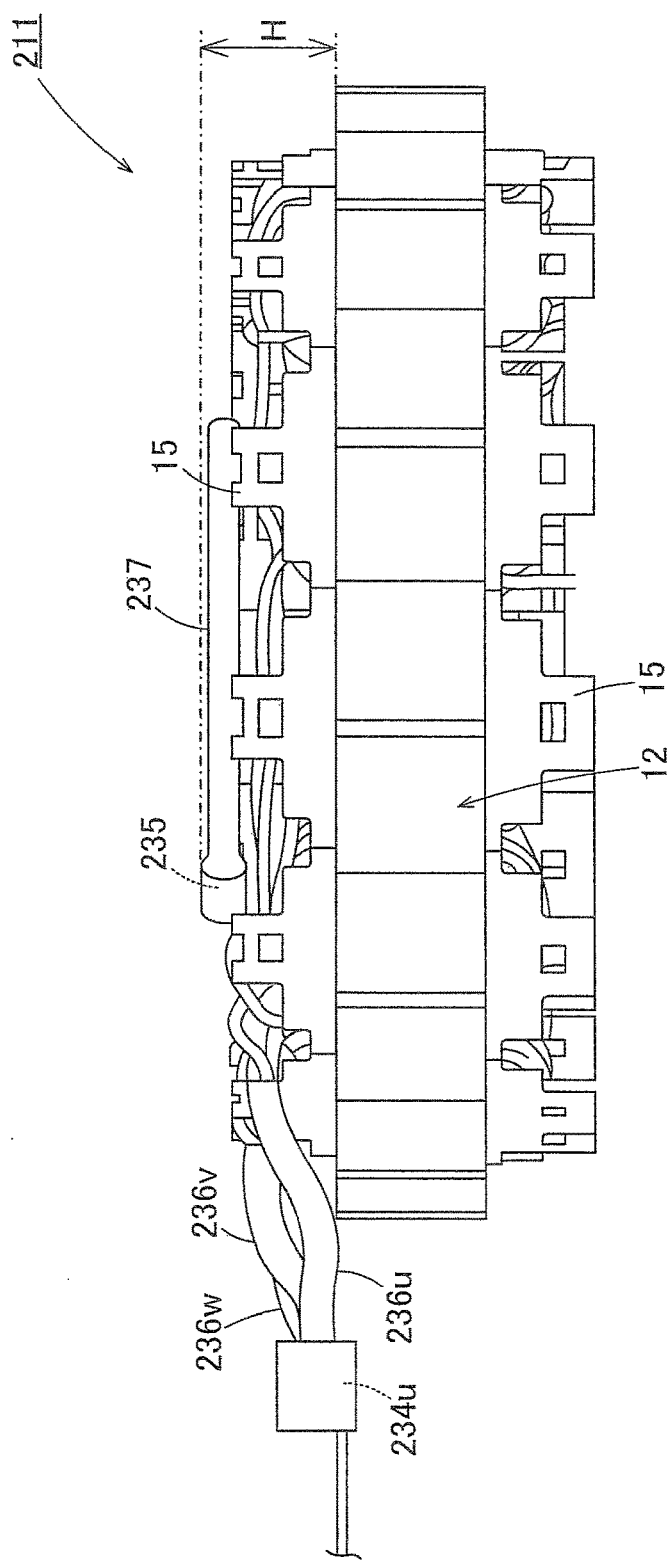
FIG. 9 is a side view of the rotating electric machine shown in FIG. 7.

As shown in FIG. 7, the lines 31a on the stator 211 are separately arranged on the windings 31 without being received in and protected by any protection tubes. Moreover, as shown in FIGS. 7 and 9, the lines 31b on the stator 211 are received in the one protection tube 237 and arranged on the same side of the windings 31 as the lines 31a. It is noted that there is no installation spaces on the windings 31. This causes an increase in height H of the coil end on the stator 211.

Figure 10:
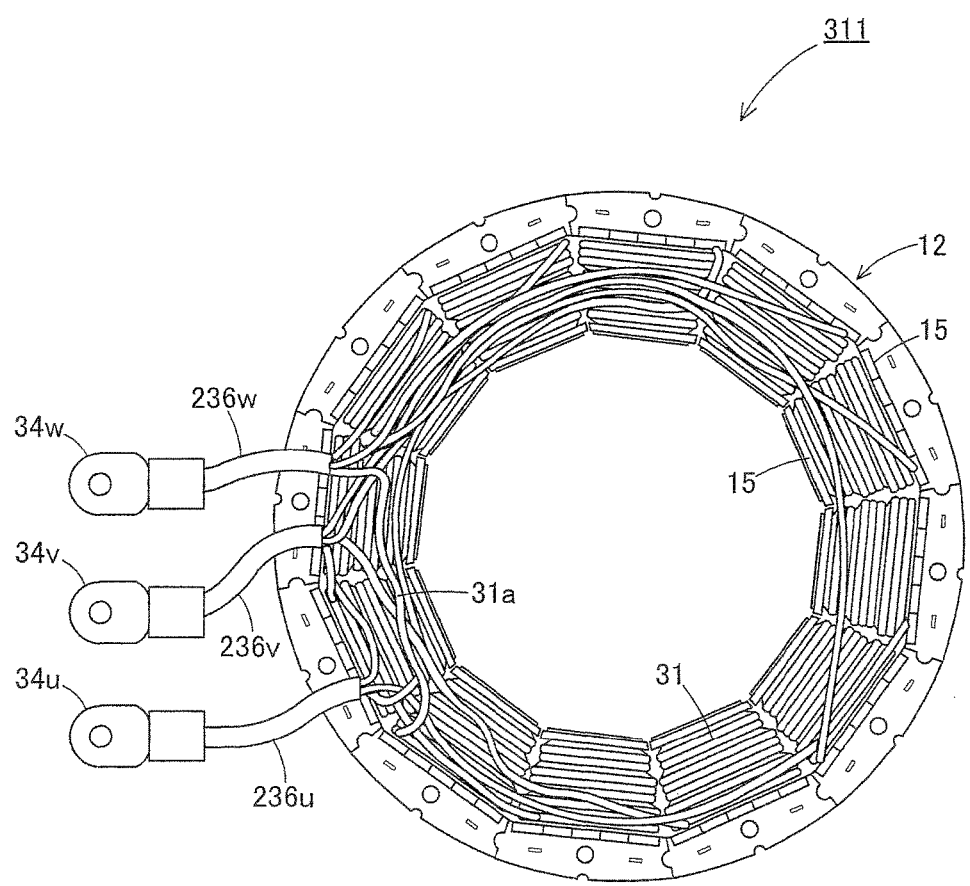
FIG. 10 is a top view similar to FIG. 7, illustrating another less preferred embodiment of a rotating electric machine.
Figure 11:
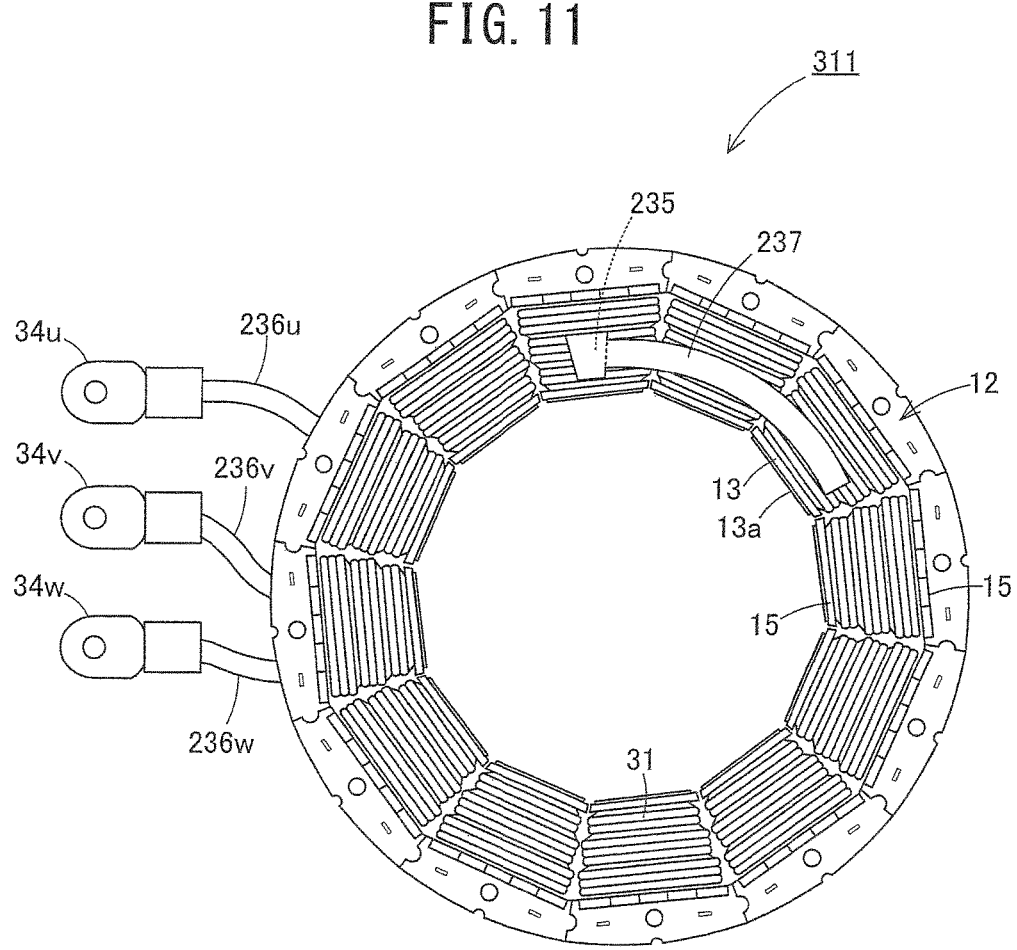
FIG. 11 is a bottom view similar to FIG. 8, illustrating the rotating electric machine shown in FIG. 10.
Figure 12:
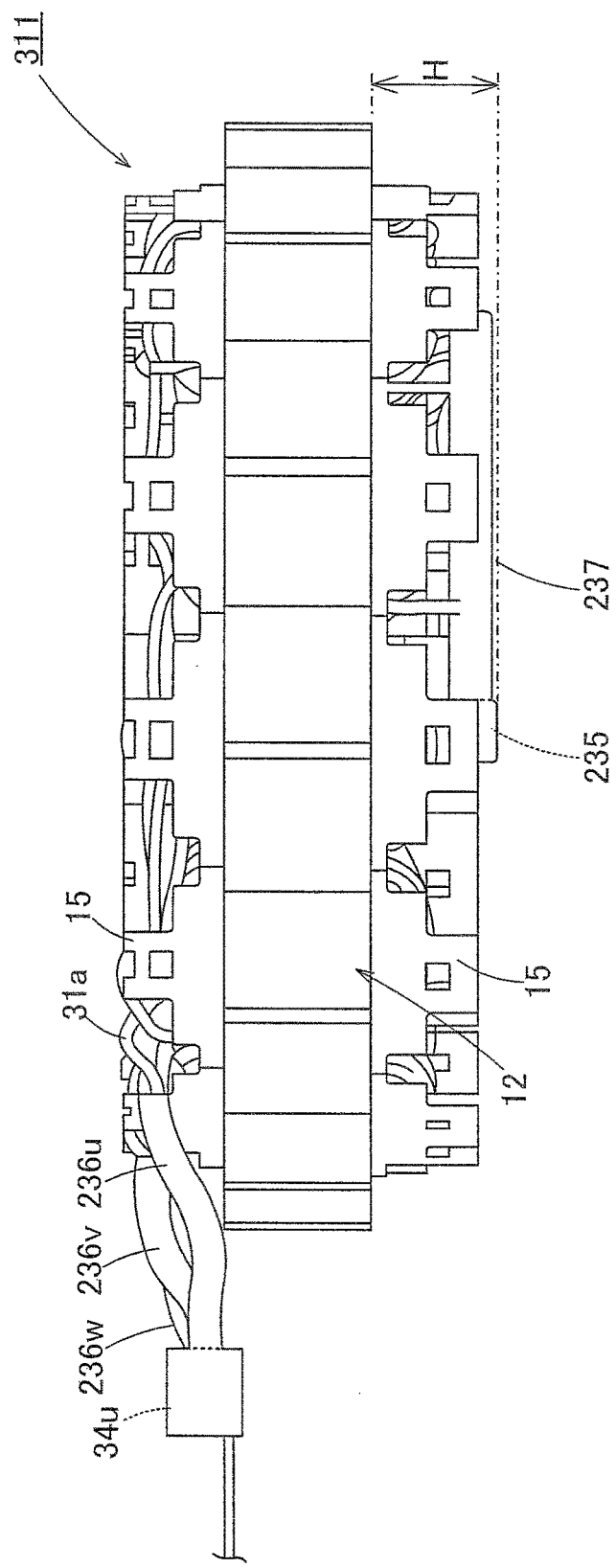
FIG. 12 is a side view of the rotating electric machine shown in FIG. 10.

In order to alleviate the above-mentioned problem, there is another possible installation of four sets of windings 31 to a stator 311 as shown in FIGS. 10 to 12 to implement the circuit configuration shown in FIG. 6. Referring to FIG. 10, the stator 311 is similar to the stator 211 in that lines 31a from one ends of the windings 31 for each of U, V and W phases are individually wired on one side of the windings 31. Referring to FIG. 11, the stator 311 is different from the stator 211 in that one protection tube 237 that receives all lines 31b together is formed in a shape curving to follow the external ring form of the stator 311 such that the lines 31b are wired on the other side of the windings 31 (i.e., a side of the windings 31 opposite, with respect to the axis of rotation of a shaft 100, to the one side on which the lines 31a are wired).

As can be seen from the above description, the stator 311 fails to sufficiently solve the problem encountered with the stator 211 even though the lines 31a and 31b are pulled out in one and the opposite directions of the axis of rotation of the shaft 100 and wired on one and the opposite sides of the windings to implement the circuit configuration shown in FIG. 6. Similarly to the stator 211, the lines 31a on the stator 311 are separately arranged on the windings 31 without being received in and protected by any protection tubes. Moreover, as shown in FIGS. 11 and 12, the lines 31b on the stator 311 are received in one protection tube 237 and arranged on the windings 31 as the lines 31a where there are no installation spaces. This causes an increase in height H of a coil end.

In contrast, the lines 31a and the lines 31b are distributed in both the first and second directions along the axis of direction of the shaft 100. These lines 31a and 31b are received in the protection tubes 36u, 36v, 36w, 37a, 37b, 37c and 37d that are laid in the installation spaces 18a and 18b created by the above-mentioned deviation of each of the windings 31. This makes the rotating electric machine 10 thin by restraining the height H of the coil end of the stator 11 from being increased.

As previously described, in the illustrated embodiment of the rotating electric machine 10, the neutral points of the windings 31, each for one set of three-phase windings 31, are on a plurality of sites. Thus, the lines 31b joining at the neutral points are received in narrow protection tubes 37a, 37b, 37c and 37d like the protection tubes 36u, 36v and 36w that receive the lines 31a from the windings 31 for each of three phases. These protection tubes 36u, 36v, 36w, 37a, 37b, 37c and 37d are laid in the installation spaces 18a and 18b created by the deviation of each of the windings 31 such that the number of turns of the wire wound around the first area that is on the side of the inner wall portions 16a and 16b is less than the number of turns of the wire wound around the second area that is on the side of the outer wall portions 17a and 17b, where the first area is less radially remote from the axis of rotation of the shaft 100 than the second area is.

Therefore, in the illustrated embodiment of the rotating electric machine 100, the stator 11 may be made thin without any increase in height H of the coil end even though the lines 31a and 31b from the windings 31 are received together in the protection tubes 36u, 36v, 36w, 37a, 37b, 37c and 37d.

Although the embodiment of the rotating electric machine has been described, it will be apparent to person skilled in the art that modifications may be made without departing from the scope of the present invention. All such modifications and equivalents thereof are intended to be covered by the following claims described in scope of claims.

REFERENCE SIGNS LIST 10 rotating electric machine
11 stator
12 split core
13 salient pole
15 insulator
16a, 16b inner wall portion
17a, 17b outer wall portion
18a, 18b installation space
21 rotor
31 winding
31a, 31b line
32u, 32v, 32w common line (current-carrying circuit, three-phase line)
33a, 33b, 33c, 33d neutral line (neutral point)
34u, 34v, 34w ring terminal
35a, 35b, 35c, 35d sleeve terminal (neutral point)
36u, 36v, 36w protection tube
37a, 37b, 37c, 37d protection tube (neutral point)
100 shaft (axis of rotation)

The invention claimed is:

1. A rotating electric machine with an axis of rotation, comprising:
   a stator including a plurality of salient poles, and a plurality sets of three windings for three phases wound around the plurality of salient poles; and
   a rotor rotatable about the axis of rotation in response to magnetic field created upon passing three-phase current through the plurality sets of three phase windings,
   wherein lines from one ends of the windings for each of the three phases are connected in parallel, and lines from the other ends of the windings of each of the plurality of sets are connected at a neutral point;
   wherein the number of turns of the winding around a first area on each of the salient poles is less than the number of turns of the winding around a second area on each of the salient poles, where the first area is less radially remote from the axis of rotation than the second area, and each first area includes a reception space extending over the windings;
   wherein the neutral points are arranged on one side of the windings to follow the periphery of the stator; and
   wherein each neutral point is located in a corresponding reception space within a respective first area.

2. The rotating electric machine as claimed in claim 1,
   wherein the lines from the one ends of the windings for each of the three phases are connected to one of three phase lines;
   wherein the lines are arranged on the other side of the windings to follow the periphery of the stator; and
   wherein the lines from the one ends of the windings for each of the three phases are located in a corresponding reception space within a respective first area.

3. The rotating electric machine of claim 1, wherein the stator comprises a plurality of insulators, wherein each insulator is located between a respective salient pole and a respective set of winding.

4. The rotating electric machine of claim 3, wherein the insulator comprises an inner wall portion extending along the axis of rotation and an outer wall portion extending along the axis of rotation, and the first area of each salient pole is adjacent to a respective inner wall portion, and the second area of each salient pole is adjacent to a respective outer wall portion.

5. The rotating electric machine as claimed in claim 1, wherein the lines connected at the neutral points are received in protection tubes, and each protection tube is located in a corresponding reception space within a respective first area.

* * * * *